United States Patent
Lembcke et al.

(10) Patent No.: US 8,522,936 B2
(45) Date of Patent: Sep. 3, 2013

(54) SHOCK ABSORBER FOR SLIDING SLEEVE IN WELL

(75) Inventors: Jeffrey Lembcke, Cypress, TX (US);
Scott Williamson, Castle Rock, CO (US); Robert Coon, Missouri City, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 983 days.

(21) Appl. No.: 12/107,894

(22) Filed: Apr. 23, 2008

(65) Prior Publication Data

US 2009/0266659 A1 Oct. 29, 2009

(51) Int. Cl.
*F16F 11/00* (2006.01)

(52) U.S. Cl.
USPC .......................................... 188/375; 188/377

(58) Field of Classification Search
USPC ................ 188/376, 377, 371, 375; 251/325, 251/64, 68.16; 166/321, 328, 329, 332.4, 166/317
See application file for complete search history.

(56) References Cited

U.S. PATENT DOCUMENTS

| | | |
|---|---|---|
| 3,970,147 A | 7/1976 | Jessup et al. |
| 4,063,593 A | 12/1977 | Jessup |
| 4,064,937 A | 12/1977 | Barrington |
| 4,270,610 A | 6/1981 | Barrington |
| 4,311,197 A | 1/1982 | Hushbeck |
| 4,618,000 A | 10/1986 | Burris, II |
| 4,657,082 A | 4/1987 | Ringgenberg |
| 4,657,083 A | 4/1987 | Ringgenberg |
| 4,691,779 A | 9/1987 | McMahan et al. |
| 4,842,062 A | 6/1989 | Schneider et al. |
| 5,368,098 A | 11/1994 | Blizzard, Jr. et al. |
| 5,425,424 A * | 6/1995 | Reinhardt et al. ............ 166/291 |
| 5,464,062 A | 11/1995 | Blizzard, Jr. |
| 5,511,617 A * | 4/1996 | Snider et al. .................. 166/291 |
| 3,283,823 A | 11/1996 | Warrington |
| 5,605,195 A | 2/1997 | Eslinger et al. |
| 6,390,200 B1 * | 5/2002 | Allamon et al. .............. 166/376 |
| 6,497,295 B1 * | 12/2002 | Carmichael et al. ........... 175/48 |
| 6,907,936 B2 | 6/2005 | Fehr et al. |
| 7,021,389 B2 * | 4/2006 | Bishop et al. .................. 166/373 |
| 7,108,067 B2 * | 9/2006 | Themig et al. ................ 166/317 |

(Continued)

OTHER PUBLICATIONS

First Office Action in counterpart Canadian Appl. No. 2,661,941, mailed May 11, 2011.

(Continued)

*Primary Examiner* — Bradley King
*Assistant Examiner* — Vishal Sahni
(74) *Attorney, Agent, or Firm* — Wong, Cabello, Lutsch, Rutherford & Brucculeri LLP (57) ABSTRACT

A sliding sleeve for frac operations or the like has a housing, a sleeve, and a shock absorber. The sleeve is movable within the housing's internal passage relative to flow ports. The shock absorber, which can have a cylindrical body, positions partially in the sleeve's internal passage and has a distal end that extends beyond the sleeve. A lip on the sleeve's end is engageable with the internal shoulder. When a ball is dropped on the sleeve's ball seat and pumped fluid forces the sleeve to an open position, the shock absorber absorbs the movement of the sleeve. To absorber the movement, the shock absorber breaks one or more shear pin connections with the sleeve, interposes its lip between the sleeve's distal end and the internal shoulder, and fractures at least a portion of its distal end from the impact with the sleeve.

33 Claims, 4 Drawing Sheets

(56) References Cited

U.S. PATENT DOCUMENTS

| | | | |
|---|---|---|---|
| 7,150,326 B2* | 12/2006 | Bishop et al. | 166/373 |
| 7,673,677 B2 | 3/2010 | King et al. | |
| 7,806,189 B2* | 10/2010 | Frazier | 166/376 |
| 2003/0030197 A1* | 2/2003 | Marks | 267/136 |
| 2004/0118564 A1 | 6/2004 | Themig et al. | |
| 2005/0072575 A1* | 4/2005 | Yeo et al. | 166/374 |
| 2006/0272807 A1* | 12/2006 | Adam et al. | 166/207 |

OTHER PUBLICATIONS

Weatherford International, Ltd., "OptiSleeve(TM) Sliding Sleeve," copyright 2006, 3-pgs.

Weatherford International, Ltd., "OptiSlim(TM) Sliding Sleeve," copyright 2007, 2-pgs.

Weatherford International, Ltd., "WXO and WXA Standard Sliding Sleeves," copyright 2007-2008, 2-pgs.

Weatherford, "Sliding Sleeve/Shifting Tools/Stem," copyright 2003, pp. 135-137.

Weatherford International, Ltd., "ROSS(R) Remotely Operated Sliding Sleeve," copyright 2006-2007, 2-pgs.

Weatherford International, Ltd., "ROSS(R)-T Remotely Operated Sliding Sleeve-Thermal," copyright 2008, 2-pgs.

Weatherford International, Ltd., "ROSS(R)-V Remotely Operated Variable Sliding Sleeve," copyright 2006-2007, 2-pgs.

Baker Hughes, Inc., "Frac-Point(TM) Open-Hole Fracture Completion System," copyright 2006, 4-pgs.

Office Action in counterpart Canadian Appl. 2,661,941, dated Jan. 9, 2013.

Office Action in counterpart GCC Patent Appl. GCC/P/2009/13333, dated Jun. 24, 2013.

* cited by examiner

SHOCK ABSORBER FOR SLIDING SLEEVE IN WELL

BACKGROUND

A fracing operation uses a series of packers and sliding sleeves to sequentially isolate different zones of a downhole formation. After the packers and sliding sleeves are run downhole, a ball or plug is pumped downhole to close off the flow path through the assembly's bottom end. Next, operators set the packers to create multiple isolated zones down the borehole. Then, operators apply a frac treatment successively to each of the isolated zones by selectively opening the sliding sleeves and allowing the treatment fluid to interact with the adjacent zones of the formation.

To open each sliding sleeve, operators drop a specifically sized ball into the tubing and land it on a corresponding ball seat on the designated sliding sleeve. Once seated, the ball closes off the lower zone just treated, and built up pressure on the seated ball forces the sliding sleeve open so frac fluid can interact with the adjacent zone of the formation. Operators repeat this process up the tubing to treat all of the zones by successively dropping bigger balls against bigger seats in the sliding sleeves. Once the frac treatment is complete, flow in the tubing can float all the balls to the surface, or operators can mill out the ball and ball seats from the sliding sleeves.

When dropped, the balls typically travel at a high rate of speed due to the high pump rates used and due to the momentum of the fluid column above the balls. When the ball hits the ball seat in the sliding sleeve, the momentum can damage the sleeve as it slams to the open position. To mitigate potential damage, operators typically alter the pump rate to slow down the ball before it hits the ball seat: however; altering the pump rate further slows and complicates the operation and is not always successful. As a result, the sliding sleeve may become damaged.

SUMMARY

A sliding sleeve apparatus for frac operations or the like has a housing, a sleeve, and a shock absorber. The sleeve is movable within the housing's internal passage relative to flow ports. The shock absorber, which can have a cylindrical body, positions partially in the sleeve's internal passage and has a distal end that extends beyond the sleeve. When a ball is dropped on the sleeve's ball seat and pumped fluid forces the sleeve to an open position, the shock absorber absorbs the movement of the sleeve. To absorb the movement and energy of the sleeve, the shock absorber can break one or more shear pin connections with the sleeve, interpose its lip between the sleeve's distal end and an internal shoulder in the housing, and can fracture at least a portion of its distal end from the impact of the moving sleeve.

DETAILED DESCRIPTION

In FIGS. 1A-1C and 2A-2C, a sliding sleeve apparatus 10 that can be used for frac operations and the like includes a housing 20 with upper and lower subs 22 and 24. A sleeve 30 movable within the housing 20 opens or closes fluid flow through the housing's flow ports 26 based on the sleeve 30's position. An exemplary type of sliding sleeve apparatus includes the OptiSleeve™ family of sliding sleeves available from Weatherford International Ltd., although other sliding sleeve types may also be used.

Figures 1A, 3:
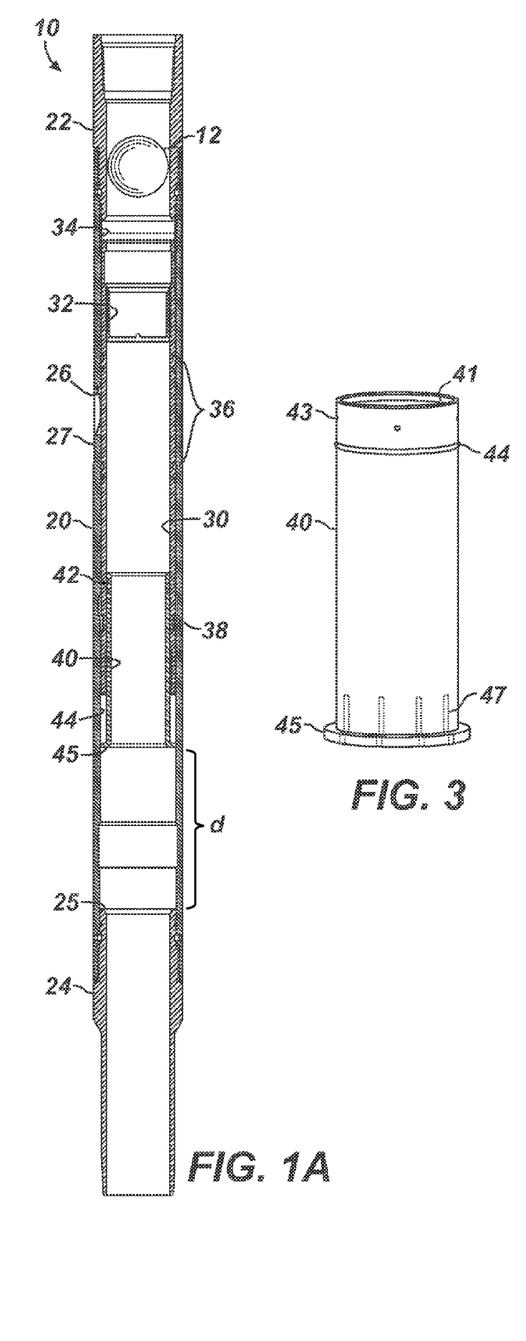
FIG. 1A illustrates a sliding sleeve apparatus in a closed state having a shock absorber according to certain teachings of the present disclosure.
FIG. 3 illustrates a perspective view of a shock absorber.
Figure 1B:
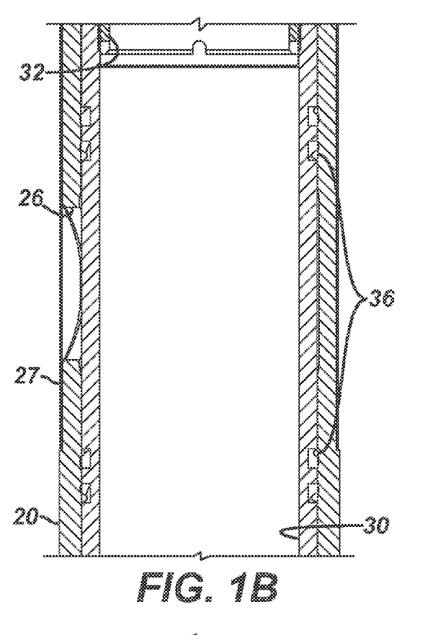
FIGS. 1B-1C illustrate portions of the sliding sleeve in FIG. 1A.
Figure 1C:
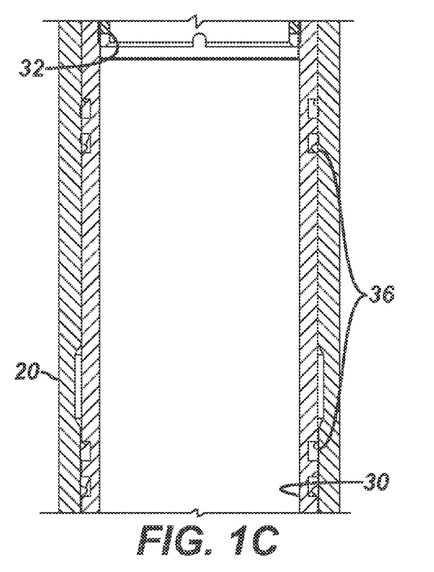

When initially run downhole, the sleeve 30 positions in the housing 20 in a closed state in which a holder 34 holds the sleeve 30 toward the upper sub 22 as shown in FIGS. 1A-1C. Outer seals 36 on the sleeve 30 engage the housing 20's inner wall both above and below the flow ports 26 to seal off the ports 26. Also, locking dogs 38 fit into an annular slot within the housing 20. In addition, the flow ports 26 may be covered by a protective sheath 27 to prevent debris from entering into the sliding sleeve apparatus 10. Such a sheath 27 can be composed of a destructible material and can take the form of sheaths disclosed in co-pending U.S. patent application Ser. No. 11/683,848, which is incorporated herein by reference.

Figure 2A:
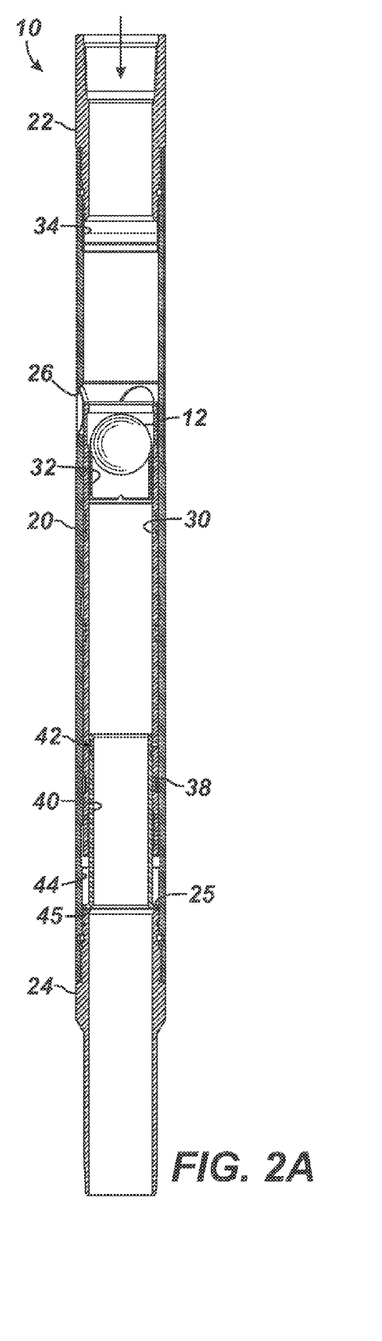
FIG. 2A illustrates the sleeve apparatus during opening after a ball has been dropped and the shock absorber contacts the lower sub.
Figure 2B:
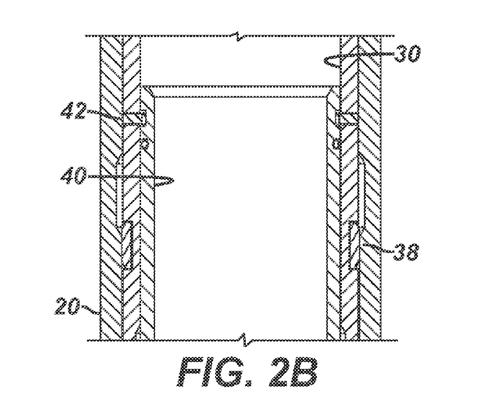
FIGS. 2B-2C illustrate portions of the sliding sleeve in FIG. 2A.
Figure 2C:
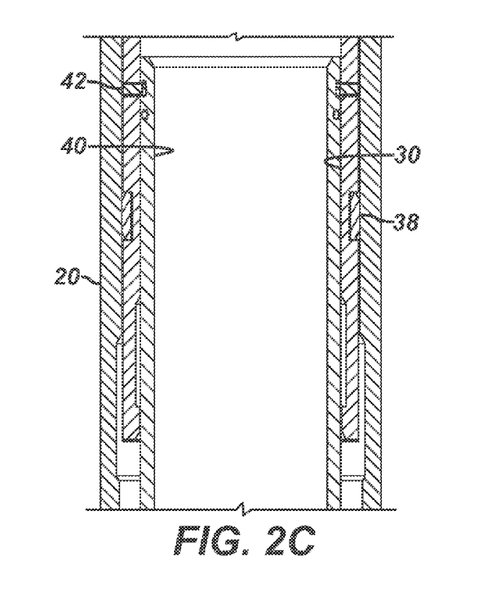

To open the sleeve apparatus 10 for a frac operation, operators drop a ball 12 downhole and pump the ball 12 until it reaches a ball seat 32 disposed in the sleeve 30 as shown in FIG. 2A. Once seated, built up pressure forces against the sleeve 30 in the housing 20, thereby freeing dogs 38 from the housing's annular slot and moving the sleeve 30 downward as shown in FIGS. 2A-2C. As it slides, the sleeve 30 uncovers the flow ports 26.

To mitigate potential damage to the sleeve apparatus 10 as the sleeve 30 moves downward, a shock absorber 40 connects to the sleeve 30's lower end. As shown in FIGS. 1A-1C, this shock absorber 40 is initially connected in an extended position by shear pins or other temporary connections 42 within the sleeve 30. As the sleeve 30 moves downward during opening as shown in FIG. 2A, the absorber's distal lip 45 engages a shoulder 25 on the housing's lower sub 24, thereby breaking the downward energy of the moving sleeve 30.

FIG. 3 shows the shock absorber 40 in isolated detail. As shown, the shock absorber 40 is an insert having a cylindrical body with a distal lip 45 disposed about its end. Preferably, the absorber 40's internal passage 41 is no smaller than that of the sleeve's corresponding ball seat (32; FIG. 1A) so other balls with smaller diameters may pass through the absorber 40 to lower ball seats in the tubing. As also shown in FIG. 3, the shock absorber 40 has holes 43 into which the shear pins (42; FIG. 1A) can fit, and an O-ring seal 44 disposed about the shock absorber 40 can engage the sleeve's internal passage. The shock absorber 40's body can have a solid construction as shown, but in other alternatives, the body can have slits, grooves, holes or the like. For example, the distal portion of the absorber 40 may include a plurality of slits 47 as shown to facilitate break up and fracturing of this portion as discussed below.

Figure 4:
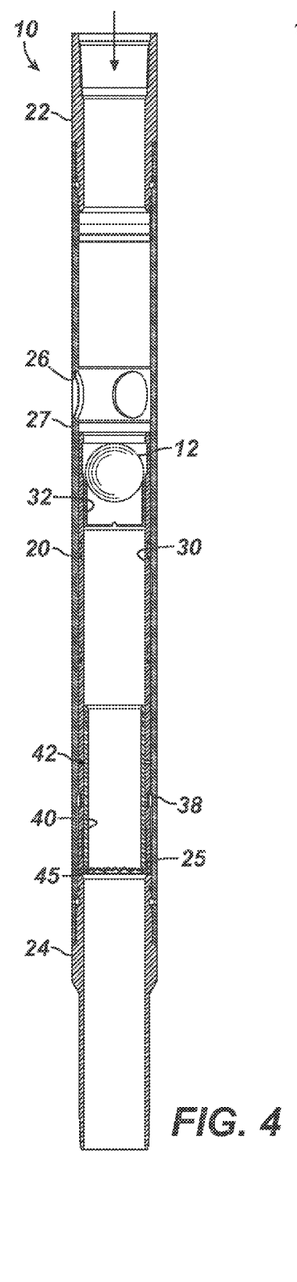
FIGS. 4-5 illustrate the sleeve apparatus after impact has been absorbed by the shock absorber.

Turning now to FIG. 4, the continued force against the sleeve 30 by the fluid pressure on the seated ball 12 eventually breaks the shear pins 42, further breaking the downward energy of the moving sleeve 30. Once freed, the sleeve 30 moves further downward within the housing 20 until the sleeve 30's distal end reaches adjacent the shoulder 25 and the sleeve's dogs 38 reach the housing 20's lower annular slots. The pressure on the shock absorber 40 and the impact of the sleeve 30 against the absorber 40's distal lip 45 breaks this lip 45 or fractures portion of the absorber's end into pieces as shown in FIG. 4.

Figure 5:
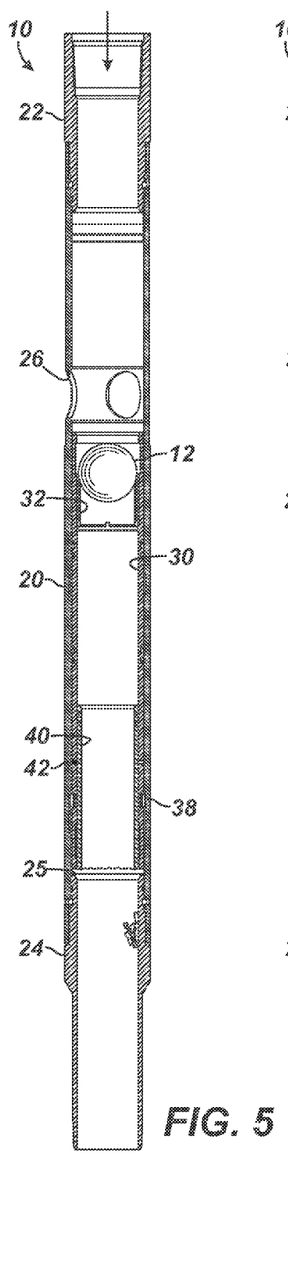

To further break the downward energy, the piston area 44 (i.e., the annular space between the absorber 40 and the housing 20) can be filled with a thick or viscous filler material, such as a heavy grease, foam, or the like. This filler not only impedes the downward movement of the sleeve 30 and absorbs its energy, but the force of the sleeve 30 against this filler material pushes the material out from this area 44. When pushed, the force of the filler material can implode the lower portion of the shock absorber 40 in the process. Eventually, as shown in FIG. 5, the absorber's broken pieces may land in the lower sub 24 if the sleeve apparatus 10 is arranged horizontally or may otherwise fall downhole.

Figure 6:
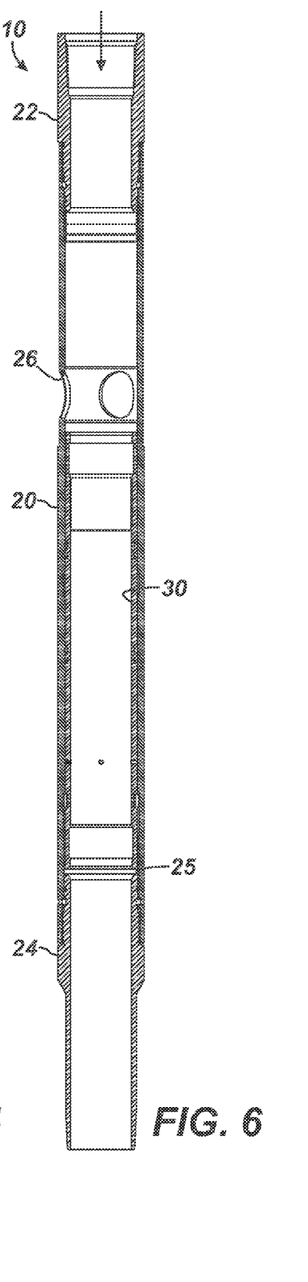
FIG. 6 illustrates the sleeve apparatus after the ball has been flowed back to the surface and the ball seat and shock absorber having been milled out.

At this point, fluid pressure destroys the destructible sheath (27; FIG. 4) that once covered the flow ports 26. Now, the frac operation can proceed because the seated ball 12 diverts fluid through the now open flow ports 26 (FIG. 5) so the fluid can interact with the adjacent formation (not shown). After frac operations are completed and as shown in FIG. 6, the ball 12 can be floated to the surface or milled out. Likewise, the seat 32 and the remainder of the shock absorber 40 are milled out to open the passage through the sleeve apparatus 10 and the tubing. Once milled out, the sleeve apparatus 10 can operate as a standard sliding sleeve capable of being opened and closed by conventional tools.

As evidenced above, the shock absorber 40 provides a crumple zone at the sleeve 30's lower end that absorbs impact energy and prevents damage to the sleeve apparatus 10. Engagement of the absorber 40's distal lip 45 with the shoulder 25, breaking of the shear pins 42, interposing of the lip 45 between the sleeve 30 and the shoulder 25, and fracturing or breaking of portion of the absorber 40, as well as any friction that may exist between the sleeve 30 and the absorber 40 and use of filler material in area 44 can all help to absorb the sleeve 30's energy as it moves to the open position. Advantageously, the shock absorber 40 does not require the pump rate to be slowed down prior to the ball 12 reaching the seat 32 so the apparatus 10 with the shock absorber 40 can save valuable rig time by making the frac operation faster and more efficient. In addition, the absorber 40 helps to mitigate potential damage to the sleeve apparatus 10 even if unduly high pump rates are inadvertently used.

In the closed position of FIG. 1A, the shock absorber 40 initially extends from the sleeve 30's distal end and positions a distance d from the housing's shoulder 25. In this arrangement, the shock absorber 40 moves with the sleeve 30 during opening and subsequently engages the shoulder 25. As an alternative arrangement shown in FIG. 7, the shock absorber 40 can have its distal lip 45 already initially engaged with the shoulder 25 when the sleeve 30 is in the closed position. Again, the area 44 can be filled with a filler material, such as heavy grease, foam, or the like. During opening, the pressure build-up on the seated ball 12 forces against the sleeve 30. Eventually, the shear pins 42 break and the sleeve 30 moves within the housing 20. Finally, the sleeve 30's distal end impacts against and breaks up the absorber's distal lip 45 so that the absorber 40 absorbs the energy of the sleeve 30's movement in the same manner described previously.

As discussed previously in FIG. 3, the shock absorber 40 can have a cylindrical body with the distal lip 45 disposed about its end. In general, the shock absorber 40 can have any other suitable shape. As one alternative shown in FIGS. 8A-8B, the shock absorber 40's cylindrically shaped body can be collapsible and can have a plurality of corrugations 48 along a portion of its length to absorber impact. Again, the area 44 around these corrugations 48 can be filled with a filler material such as heavy grease or the like. Preferably, the corrugations 48 are configured to collapse inward into the absorber's internal passage as shown in FIG. 8B so as not to interfere with the movement of the sleeve 30 in the space between the shock absorber 40 and the sleeve's housing 20.

Figures 7, 8A, 8B, 9A, 9B:
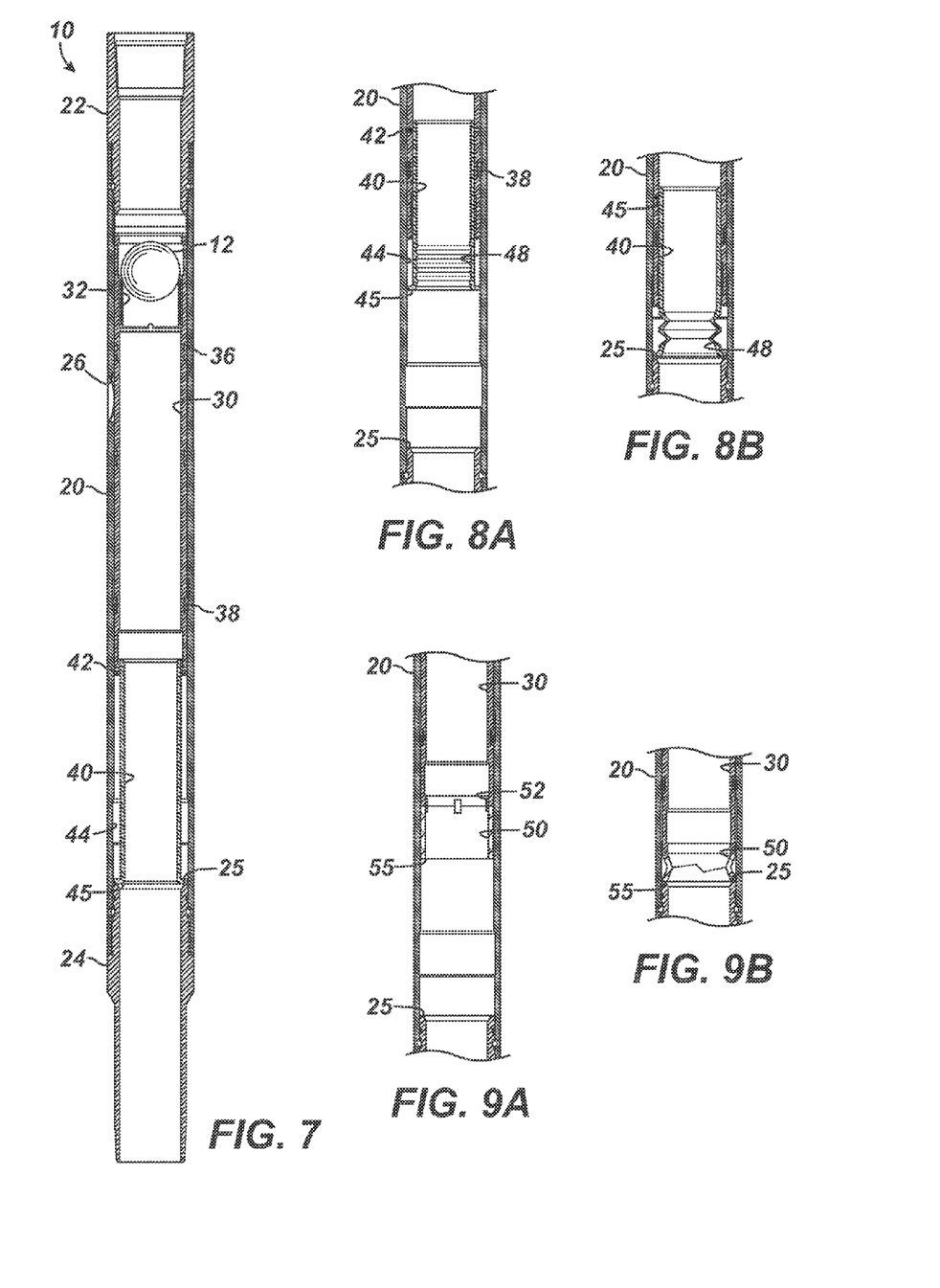
FIG. 7 illustrates the sleeve apparatus having a shock absorber in an alternative position.
FIGS. 8A-8B illustrate the sleeve apparatus having an alternative shock absorber with a plurality of corrugations.
FIGS. 9A-9B illustrate the sleeve apparatus having an alternative shock absorber affixed to the bottom of the movable sleeve.

In FIGS. 9A-9B, an alternative shock absorber 50 is affixed to the distal end of the movable sleeve 30. Here, a plurality of clips, shear pins, or other temporary fasteners 52 attach the shock absorber 50 to the end of the sleeve 30. As shown in FIG. 9A with the sleeve 30 in the closed position, the shock absorber 50 is positioned away from the internal shoulder 25. During opening, the shock absorber 50 moves with the sleeve 30 until it reaches the shoulder 25. At this point and as shown in FIG. 9B, the absorber 50 absorbs the impact and protects the sleeve 30 as it reaches impact with the shoulder 25. To absorb the impact, the fasteners 52 may break, and the absorber 50 can fracture, deform, or both.

In accordance with the various teachings, the shock absorbers disclosed herein can be composed of the same material used for the ball seat such as a cast iron material, but any other suitable material capable of absorbing impact and later being milled out can be used. Accordingly, the disclosed shock absorbers can be made of a material capable of fracturing and/or deforming during the impact and can be made of cast iron, aluminum, composites, plastic, glass, ceramic, etc. In general, the disclosed shock absorbers can have a cylindrical shape, but other shapes are also possible. Moreover, the disclosed shock absorbers can be solid in construction or can have slits, grooves, holes, or the like to enhance its ability to fracture or deform. As noted above, sheer pins are used between the absorber and sleeve. In addition to or as an alternative, the shock absorber may be initially held in the extended position by mere friction, elastomer O-rings, movable dogs, or other form of temporary connection that would initially hold the absorber but would be later broken.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A sliding sleeve apparatus, comprising:
   a housing having a first internal passage extending therethrough and defining an internal shoulder in the first internal passage, the housing defining at least one flow port communicating the first internal passage outside the housing;
   a sleeve moveable within the first internal passage relative to the at least one flow port from a first position to a second position to control communication between the first internal passage and the at least one flow port, the sleeve having a second internal passage extending therethrough and having a distal end along an axis of the sleeve; and a cylindrical insert movable with the sleeve and defining a third internal passage extending from a first end of the cylindrical insert to a second end of the cylindrical insert, the first end breakably connected to the sleeve, the second end extending along the axis beyond the distal end of the sleeve, wherein the cylindrical insert engages its second end with the internal shoulder in advance of the distal end of the sleeve and break the connection with the sleeve in response to the engagement with the internal shoulder to absorb a first part of the movement of the sleeve from the first position to the second position.

2. The apparatus of claim 1, wherein the second end of the cylindrical insert is positioned a distance from the internal shoulder when the sleeve is in the first position.

3. The apparatus of claim 1, wherein the cylindrical insert comprises an interposable portion interposing between the distal end of the sleeve and the internal shoulder of the housing to absorb a second part of the movement of the sleeve.

4. The apparatus of claim 3, wherein the interposable portion comprises a lip disposed on the cylindrical insert and extending into a space between the cylindrical insert and the first internal passage.

5. The apparatus of claim 1, wherein at least one fastener breakably connects the first end of the cylindrical insert to the second internal passage of the sleeve.

6. The apparatus of claim 1, further comprising a material disposed in an annular space between the cylindrical insert and the housing and impeding the movement of the sleeve from the first position to the second position.

7. The apparatus of claim 5, wherein the cylindrical insert absorbs a second part of the movement of the sleeve when the material implodes the cylindrical insert via force from the movement of the sleeve from the first position to the second position.

8. The apparatus of claim 3, wherein the interposable portion is fracturable from the cylindrical insert.

9. The apparatus of claim 1, wherein the cylindrical insert comprises a millable material.

10. The apparatus of claim 1, wherein at least a portion of the cylindrical insert is deformable, and wherein the portion of the cylindrical insert deforms to absorb a second part of the movement of the sleeve.

11. The apparatus of claim 1, wherein the sleeve comprises a ball seat disposed in the second internal passage of the sleeve.

12. The apparatus of claim 1, wherein the sleeve in the first position covers the at least one flow port, and wherein the sleeve in the second position exposes the at least one flow port.

13. A sliding sleeve apparatus, comprising:

a housing having a first internal passage extending therethrough and defining an internal shoulder in the first internal passage, the housing defining at least one flow port communicating the first internal passage outside the housing;

a sleeve moveable within the first internal passage relative to the at least one flow port from a first position to a second position to control communication between the first internal passage and the at least one flow port, the sleeve having a second internal passage extending therethrough and having a first distal end along an axis of the sleeve; and an insert breakably connected to the sleeve, the insert having a second distal end extending along the axis beyond the first distal end of the sleeve, wherein the insert engages with the internal shoulder in advance of the first distal end of the sleeve and break the connection from the sleeve in response to the engagement with the internal shoulder to absorb a first part of the movement of the sleeve from the first position to the second position.

14. The apparatus of claim 13, wherein the insert comprises an interposable portion interposable between the first distal end of the sleeve and the internal shoulder of the housing to absorb a second part of the movement of the sleeve.

15. The apparatus of claim 14, wherein the interposable portion comprises a lip disposed about the second distal end of the insert and extending into a space between the insert and the first internal passage.

16. The apparatus of claim 13, wherein a portion of the second distal end is fracturable from the insert.

17. The apparatus of claim 13, wherein the second distal end of the insert is positioned a distance from the internal shoulder when the sleeve is in the first position.

18. The apparatus of claim 13, wherein at least one fastener breakably connects the insert to the second internal passage of the sleeve.

19. The apparatus of claim 13, further comprising a material disposed in an annular space between the insert and the housing and impeding the movement of the sleeve from the first position to the second position.

20. The apparatus of claim 19, wherein the insert absorbs a second part of the movement of the sleeve when the material implodes the insert via force from the movement of the sleeve from the first position to the second position.

21. The apparatus of claim 13, wherein the insert comprises a millable material.

22. The apparatus of claim 13, wherein the insert comprises a plurality of corrugations making at least a portion of the insert deformable, and wherein the portion of the cylindrical insert deforms to absorb a second part of the movement of the sleeve.

23. The apparatus of claim 13, wherein the sleeve comprises a ball seat disposed in the second internal passage.

24. The apparatus of claim 13, wherein the sleeve in the first position covers the at least one flow port, and wherein the sleeve in the second position exposes the at least one flow port.

25. The apparatus of claim 1, wherein the cylindrical insert is collapsible, and wherein the cylindrical insert collapses to absorb a second part of the movement of the sleeve.

26. The apparatus of claim 25, wherein the cylindrical insert comprises a plurality of corrugations.

27. The apparatus of claim 13, wherein the insert is collapsible, and wherein the insert collapses to absorb a second part of the movement of the sleeve.

28. The apparatus of claim 27, wherein the insert comprises a plurality of corrugations.

29. The apparatus of claim 27, wherein the insert comprises a lip disposed about its second distal end and extending into a space between the insert and the first internal passage.

30. The apparatus of claim 27, wherein the second distal end of the insert is positioned a distance from the internal shoulder when the sleeve is in the first position.

31. The apparatus of claim 27, wherein at least one fastener breakably connect the insert to the sleeve.

32. The apparatus of claim 27, further comprising a material disposed in an annular space between the insert and the housing and impeding the movement of the sleeve from the first position to the second position.

33. The apparatus of claim 32, wherein the insert absorbs a second part of the movement of the sleeve when the material implodes the insert via force from the movement of the sleeve from the first position to the second position.

* * * * *

UNITED STATES PATENT AND TRADEMARK OFFICE
CERTIFICATE OF CORRECTION

PATENT NO. : 8,522,936 B2  Page 1 of 1
APPLICATION NO. : 12/107894
DATED : September 3, 2013
INVENTOR(S) : Lembcke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this
Twenty-third Day of May, 2017

Michelle K. Lee
*Director of the United States Patent and Trademark Office*